United States Patent [19]

Leblanc et al.

[11] 4,170,040

[45] Oct. 2, 1979

[54] DIGITAL COMPUTER FOR CALCULATING THE OPTIMAL RICHNESS OF THE AIR/FUEL MIXTURE FOR INTERNAL COMBUSTION ENGINES

[75] Inventors: Marc Leblanc, Montreuil; Bernard Lepretre, Boulogne, both of France

[73] Assignee: Regie Nationale des Usines Renault, Boulogne-Billancourt, France

[21] Appl. No.: 868,445

[22] Filed: Jan. 10, 1978

[30] Foreign Application Priority Data

Jan. 26, 1977 [FR] France ................................ 77 02099

[51] Int. Cl.[2] ........................ F02D 33/02; G06F 15/20

[52] U.S. Cl. ................................ 364/442; 123/32 EE; 123/117 D; 364/431

[58] Field of Search ................................ 364/431, 442; 123/32 EE, 117 D

[56] References Cited

U.S. PATENT DOCUMENTS

| | | | |
|---|---|---|---|
| 4,029,061 | 6/1977 | Asano | 123/32 EE |
| 4,048,479 | 9/1977 | Rivere | 364/431 |
| 4,057,042 | 11/1977 | Aono | 364/431 |
| 4,077,364 | 3/1978 | Aoki | 123/32 EE |
| 4,127,091 | 11/1978 | Léichlé | 123/117 D |

FOREIGN PATENT DOCUMENTS

| | | | |
|---|---|---|---|
| 2647517 | 6/1977 | Fed. Rep. of Germany | 123/32 EE |
| 2190162 | 1/1974 | France . | |
| 2263384 | 10/1975 | France . | |
| 2284037 | 4/1976 | France . | |
| 2286285 | 4/1976 | France . | |

*Primary Examiner*—Felix D. Gruber
*Attorney, Agent, or Firm*—Fleit & Jacobson

[57] ABSTRACT

A digital computer for calculating the optimal air/fuel mixture of a carburettor-type internal combustion engine by injecting a variable amount of air into the main air induction system, comprising an address computer disposed between the contract breaker and the memories of the computer; a first memory containing the data concerning the characteristics of the engine, said data being stored as a function of the rotational velocity of the engine; a second memory containing the data concerning the subservience velocity as a function of the engine rotational velocity; and an injection time computer adapted to sum up the data received by said first memory and the data received by an up-and-down-counter responsive both to a chemical analysis probe and to the second memory, said injection time computer being connected to a circuit for triggering said solenoid operated valve.

5 Claims, 11 Drawing Figures

FIG_8
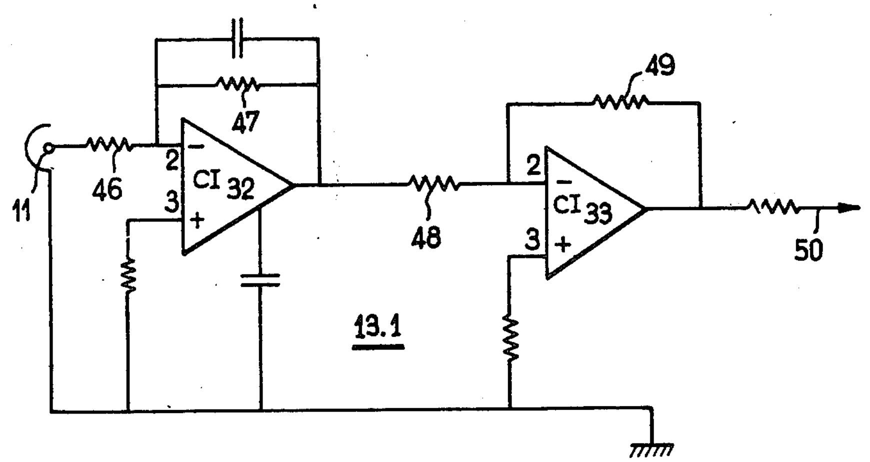
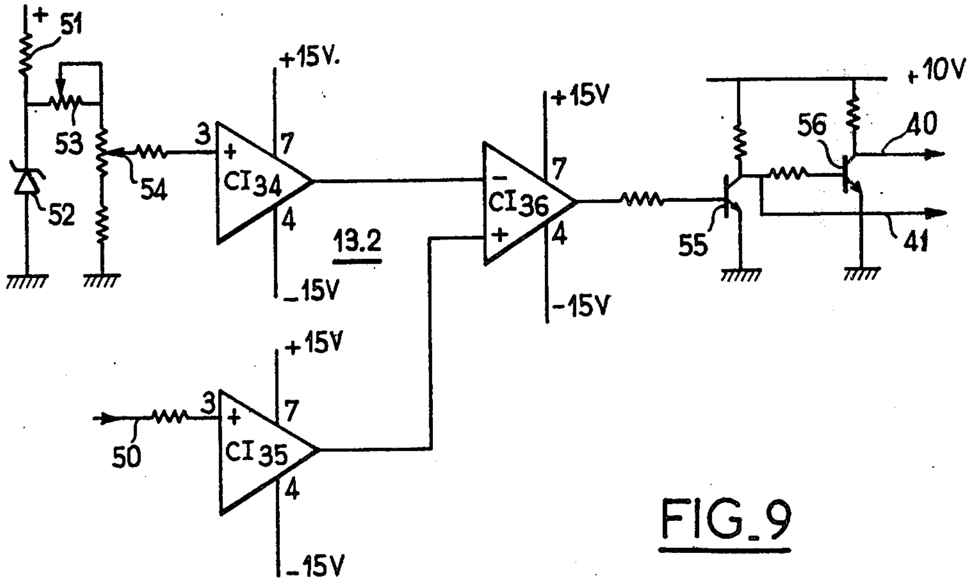
FIG_9

DIGITAL COMPUTER FOR CALCULATING THE OPTIMAL RICHNESS OF THE AIR/FUEL MIXTURE FOR INTERNAL COMBUSTION ENGINES

The present invention relates to an electronic control system for calculating the optimal richness of the air/fuel mixture for internal combustion engines. More particularly, this invention is concerned with an electrical control system including a digital computer for calculating the optimal richness of a mixture of fuel and combustion air for an internal combustion engine equipped with a carburettor, acting by injection of a variable amount of air into the mixture induction system for controlling the opening time of a solenoid-operated injection valve as a function of the engine rotational velocity determined for example from the successive openings of the contact breaker points of the ignition system and of the voltage value generated by means of a probe from the chemical analysis of the exhaust gases which is disposed within the engine exhaust gas pipe.

The French Pat. Nos. 2,201,404 and 2,238,049 disclose analogue computers performing similar functions. Analogue computers having a maximal reliability but limited calculating possibilities or capacities are still keeping the lead in the field of industrial process control. Now for controlling a relatively simple unit, a digital computer is fundamentally advantageous in that its calculating capacities are undoubtedly greater than those of any analogue system.

With a digital computer results having a high degree of resolution and precision can be obtained. It all depends on the magnitude of the selected increment. Therefore, from this specific point of view there is a possible equivalence between the digital computer and the analogue computer. On the other hand the digital computer is characterized by the following advantages when compared with the analogue computer: it is free of shift due to the aging of component elements.

This invention is directed to provide a device capable of reducing appreciably the proportion of noxious elements in the exhaust gases of an internal combustion engine operating with a single carburettor. The present invention accomplishes this by so controlling the fuel/air mixture that a stoichiometric composition is obtained, the exhaust gases have a particularly low content of deleterious substances such as nitrogen oxides and hydrocarbons, irrespective of the rotational velocity of the engine and of the engine load.

For this purpose and according to the present invention, there is provided a device comprising a computer capable of producing two superposed correction rates, namely:

1. A first-order correction referred to hereinafter as the basic function which provides a richness very close to that corresponding to the stoichiometric composition, irrespective of the engine-carburettor association contemplated; it is known that the amount Q of air absorbed by an internal combustion engine, in liters per second, is:

$$Q=(V_c N.r)/120$$

wherein:

$V_c$ is the engine cylinder cubic capacity in liters

N is the rotational velocity of the engine (r.p.m.) and r is the coefficient of air filling covering a range from 0.3 (at idling speed) to 0.5 (under full load). The basic function is substantially equal to 10% of the quantity given by the above equation (1). It is the quantity of additional air that must be injected, and the function of a first memory is to store the data A concerning the basic function (said first-order correction).

2. Since the engine load is not constant, due account is taken thereof by applying a second-order correction that can be assimilated to a servo-action or subservience. The latter should be proportional to the rotational velocity of the engine. It is quite obvious that the reaction of the mixture being burned on the exhaust gas composition is faster at 5,000 r.p.m. than at 500 r.p.m. and that, consequently, the servo-action speed must vary in proportion to the engine rotational velocity. It is the function of a second memory to contain the data concerning a subservience around the basic function, said second order correction being also rendered dependent on the voltage generated by said probe responsive to the exhaust gas oxygen content.

To sum up, it is pointed out that a basic principle of the present invention consists in controlling an amount of combustion air added to the main fuel input system and, although this may be well known, an advantage obtained by the computer according to this invention lies in the fact that it has two combustion correction rates.

According to this invention, the digital computer for calculating the optimal air/fuel mixture for an internal combustion engine of the carburettor type, by injecting a variable quantity of air into the main air induction system by controlling the opening time of an injection solenoid valve as a function of the engine rotational velocity as detected or sensed from the successive opening at the contact breaker and also from the value of the voltage read by a probe for the chemical analysis of the exhaust gases which is disposed within the exhaust gas pipe of the engine, and calculating the real time elapsing between two successive impulses corresponding to a same cylinder during two successive engine revolutions, which is of the type comprising at least one memory and one calculation element, is characterized in that it comprises: an address computer disposed between the breaker and the computer memories, i.e. a first memory containing the data related to the characteristics of the engine concerned, which are stored as a function of the engine rotational velocity, and a second memory containing the data related to the servo-action speed as a function of the engine rotational velocity; an injection time computer adapted to sum up the data received from said first memory and the data received from an up and down counter responsive both to said chemical probe and to said second memory, and that said injection time computer is operatively connected to a circuit for triggering said solenoid valve.

According to an advantageous feature characterizing this invention, the up and down counter is connected on the one hand to the second memory via an oscillator-divider and on the other hand to the probe via an amplifier and a comparator.

According to a further feature characterizing this invention, the trigger circuit is connected to the solenoid valve via a controlled amplifier and the latter comprises two essential portions, i.e. one portion permitting an unequivocal, instantaneous actuation of the movable member or the solenoid valve and another portion capable of applying a holding current for the remaining valve opening time period.

Other features will appear as the following description proceeds with reference to the accompanying drawings illustrating diagrammatically by way of example a typical form of embodiment of the invention.

In the drawings:

FIG. 8 is a wiring diagram of the probe signal amplifier;

FIG. 9 is a wiring diagram of the probe signal comparator following the preceding amplifier;

Throughout the figures of the drawings the same reference numerals designate the same component elements. Besides, the reference numerals relating to integrated circuits which are mentioned in the following disclosure are excerpted from the catalogue of MOTOROLA Corp.; except when otherwise stated.

Figure 1:
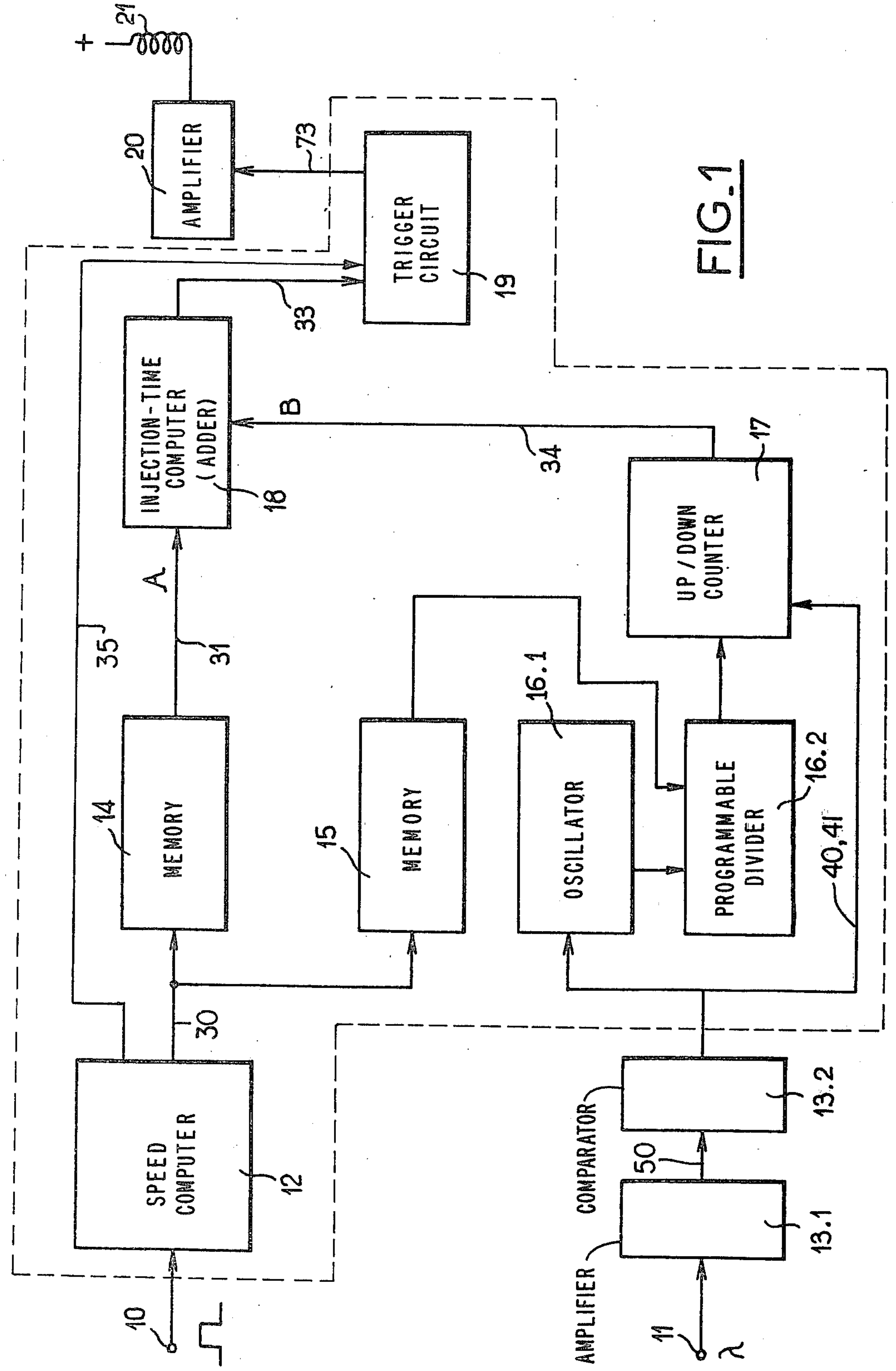
FIG. 1 illustrates in the form of a block diagram the control system according to the invention.

Referring first to the form of embodiment shown in block diagram form in FIG. 1, the digital computer according to the present invention comprises a pair of main inputs, namely an input 10 connected to the breaker of the electronic ignition system of the internal combustion engine, and a second input 11 connected to the probe λ disposed inside the exhaust pipe of the vehicle and adapted to make a permanent analysis of the residual oxygen content of the burnt gases discharged through the exhaust system to the surrounding atmosphere. The successive signals emitted by the breaker 10 are transmitted to a speed computer 12 which, from the calculation made therein, detect the address of the data to be extracted from two memories 14 and 15 connected in parallel to the output of said speed computer 12. The first memory 14 contains data concerning the above-defined basic function which permits a first-order correction according to a general curve defining the additional air injection time as a function of the engine rotational velocity. The second memory 15 contains the data concerning the subservience speed permitting a second-order correction about the selected basic function. The output of the first memory 14 is connected to a first input of an injection-time computer 18 via a bus line 31 in order to deliver a first information A thereto, whereas the output of the second memory 15 is cooperating with a programmable divider and an up/down counter connected to the probe 11 and, hence connected to a second input of computer 18 in order to deliver thereto another information B via a bus line 34 and the series connection of an up and down counter 17 and of a programmable divider 16.2 responsive to an oscillator 16.1, whereas the up/down counter 17 is also connected for an up or down operation to the λ probe 11 via the series connection of a probe amplifier 13.1 and a comparator 13.2 for comparing the probe voltage with the reference voltage. The computer 18 sums up the incoming magnitudes A and B from the first memory 14 and up and down counter 17, respectively, and operates as a function of the result thus obtained a trigger circuit 19 connected on the one hand via a bus line 33 to the computer output and on the other hand via a controlled amplifier 20 to the solenoid 21 controlling the air injection valve.

Figure 2:
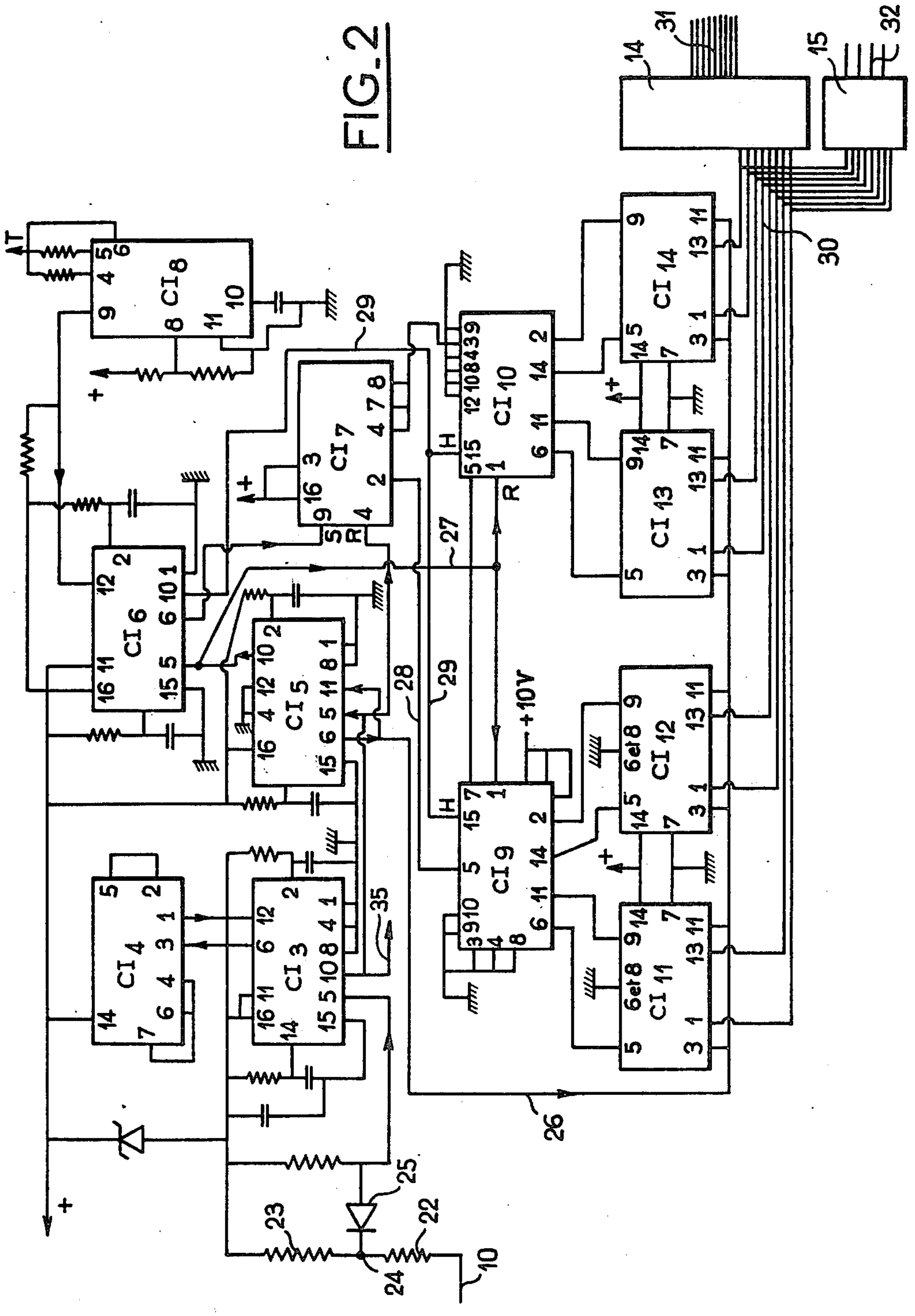
FIG. 2 illustrates the wiring diagram of a more detailed form of one embodiment of the address computer section and of the memories associated therewith.

According to the arrangement shown in FIG. 2, which corresponds to an exemplary form of embodiment of the address computer 12 and the memories 14 and 15 associated therewith, a conductor 10 connected to one terminal of the contact breaker has inserted in series therein a pair of resistors 22 and 23 constituting a resistance bridge. From a junction point 24 between resistors 22 and 23 another conductor has a diode 25 inserted therein for blocking the positive component and leads to the input 5 of a type 14,528 integrated circuit CI3 constituting a first monostable multivibrator of which the overlap time, obtained by means of the resistors and capacitors connected across its different plugs as shown in the Figure (but not described in detail), is adapted to enframe the entire breaker signal in order to prevent any stray triggerings. The signals generated by the breaker and propagated through conductor 10 are shown in line 1 of FIG. 3, whereas line 2 of the same Figure shows the preceding signals after the shaping thereof in the first monostable CI3, such as they appear on the conductor connecting the output 6 of CI3 to the input 3 of another integrated circuit CI4 which is a D-type flip-flop, or a type 14013 flip-flop, adapted to divide by two the incoming pulses so as to recover only one pulse per engine revolution. A conductor connects the output 1 of divider by two CI4 to the input 12 of the second half of monostable CI3 which samples the pulses illustrated in line 3 of FIG. 3 to, for instance, fifteen milliseconds. An integrated type ICL 8038 circuit CI8 is mounted and operates as an internal oscillator and has its output 9 connected to the input 12 of an integrated type 14528 circuit CI6 adapted to calibrate the pulses emitted from the internal oscillator CI8. It is thus clear that the assembly comprising the integrated circuits CI8 and CI6 acts as an internal clock emitting calibrated pulses at a frequence of, say, 875 Hz, for instance.

The output 10 if the second section of monostable CI3 is connected via a same conductor leading on the one hand to the input 5 of a second monostable CI5 of type 14528 and on the other hand to the input 4 of an integrated circuit CI7 of type 14027 constituting a flip-flop RS at its inputs 4 and 9, this input 4 being the resetting input whereas the input 9 is the flip-flop qualification input. The pulse as shown in line 3 of FIG. 3 and sampled to fifteen milliseconds, as just mentioned hereinabove, in the second section or half of monostable CI3, is thus fed to the reset input 4 of flip-flop RS of CI7 in order to reclose this flip-flop which was cocked during the preceding cycle by a count-starting pulse emitted by the output 6 of clock CI6 for the input 9 of CI7 and illustrated in line 6 of FIG. 3. On the other hand, the same pulse fed to the input 5 of the second monostable CI5 causes through its trailing edge the transmission from the output 6 of said monostable CI5 of a pulse also sampled to fifteen milliseconds and shown in line 4 of FIG. 3. This pulse is directed via conductor 26 to the clock inputs 3 and 11 of flip flops CI11, CI12, CI13 and CI14 of type D or type 14013 which have their inputs at 5 and 9 and their outputs at 1 and 13.

Upon receipt of this clock pulse at their inputs 3 and 11, the D-type flip-flops CI11 to CI14 store and display at their outputs 1 and 13 the data received from down counters CI9 and CI10 of type 14510, which were previously stopped by the resetting of the RS flip-flop CI7, so that the output $\overline{Q}$ thereof (designated by reference numeral 2) receives a stop pulse for the input 5 of CI9 which, via its output 7, causes CI10 to stop. When the clock pulse of line 4, FIG. 3, transmitted by conductor 26, is dropped (this pulse being a storage triggering pulse for flip-flops CI11 to CI14), the trailing edge of this clock pulse penetrates into the second half of monostable CI5 via the input 11 thereof, thus generating another pulse sampled to fifteen microseconds, as shown at line 5, FIG. 3. This pulse appears at the output 10 of the second half of monostable CI5 and propagates through a conductor 27, and causes the down counters CI9 and CI10 to resume through their input 1 their initial condition, that is fourty-six, the reason of this number being explained in the following disclosure. The same pulse issuing from output 10 of the second half of monostable CI5 penetrates likewise into the calibration circuit CI6 at the input 5 thereof and causes through its trailing edge the delivery, at output 6 of calibration circuit CI6, of another fifteen millisecond pulse shown at line 6 of FIG. 3. This pulse is fed to the input $\overline{S}$ or 9 of RS flip-flop in CI7, thus zeroing its output $\overline{Q}$ or 2. The latter transmits via a conductor 28 a fifteen-millisecond pulse illustrated in line 7, FIG. 3, to the input 5 of down counter 9 and this pulse makes it possible for down-counters CI9 and CI10 to count down pulses from the internal clock CI8, CI6 which are transmitted from the output 10 of CI6 and fed via a conductor 29 to the clock inputs 15 of down-counters CI9 and CI10 at a frequency of 875 Hz. Finally, as illustrated in line 8 of FIG. 3, it will be seen that the down-counters CI9 and CI10 are stopped at each cycle during a time integrating the three pulses illustrated in lines 4, 5 and 6 of FIG. 3 and that they count down the clock pulses during the remaining part of the cycle. This number varies as a function of the rotational velocity of the engine and is transmitted at the beginning of the following cycle to the D-type flip-flops CI11 to CI14 when they receive another storage and memorizing pulse through conductor 26.

Figure 3:
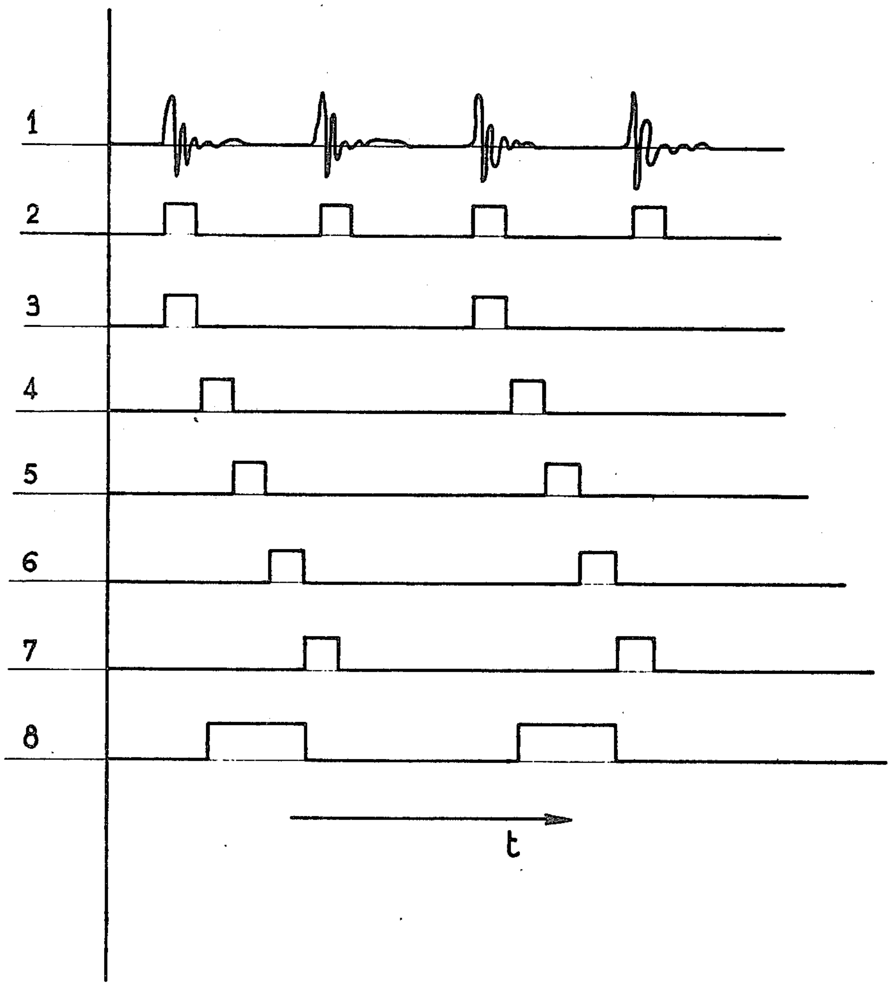
FIG. 3 is a waveform diagram of the signals obtaining at the main points of the circuit of FIG. 2.

Now the explanations concerning the mode of operation of the engine speed computer shown in FIG. 2 may be given with reference to the waveform diagram of FIG. 3 by firstly pointing out that this operation is based on the principle of down-counting (by means of down-counters CI9 and CI10) the pulses emitted by an internal clock CI8 CI6 during the time increment shown in line 8, FIG. 2, between two successive pulses received from breaker 10 during two successive revolutions of the engine crankshaft. This down-counting takes place according to this invention from number forty-six because the range of rotational velocities between 500 and 5,000 r.p.m. was divided into forty-six speed levels of one-hundred revolutions each in order to obtain a better calculation stability, the engine oscillating by about plus or minus fifty revolutions in relation to its theoretical rated rotational speed. A 5,000 r.p.m. engine velocity corresponds to address "46" in memories 14 and 15, and a 500 r.p.m. engine velocity corresponds to address "00" in the same memories.

When the pulse authorizing the storage and memorization of data is directed via conductor 26 to the clock inputs 3 and 11 of D-type flip-flops CI11 to CI14, the contents of down-counters CI9 and CI10 are discharged via inputs 5 and 9 into said D-type flip-flops CI11 to CI14, and consequently the latter will then emit through their outputs 1 and 13 an address comprising eight binary digits, this address being intended for memories 14 and 15 which are connected in parallel to the address bus line 30.

The memory 14 consists of a pair of elementary type 64×4 memories, and memory 15 comprises only a single elementary memory. Therefore, the output bus 31 of memory 14 conveys eight binary digits, whereas the output bus 32 of memory 15 conveys four binary digits for the purpose of monitoring the divider of FIG. 7. The eight binary digits delivered by memory 14 for one of the inputs of the computer shown in FIG. 4 and corresponding to the information stored in memory 14 at the address conveyed by input bus 30 represent the word A. This word A corresponds to the first-order correction defined hereinabove for the engine rotational velocity detected from the frequency of the pulses emitted by the breaker 10. In other words, the memory 14 contains at each address a number A corresponding to one value of the injection time for a given velocity, which is a first-order correction. The other memory 15 contains at each address a number intended for monitoring the programmable divider 16.2 in order to contribute to the establishment of said number B corresponding to a second-order correction with respect to A.

Figure 4:
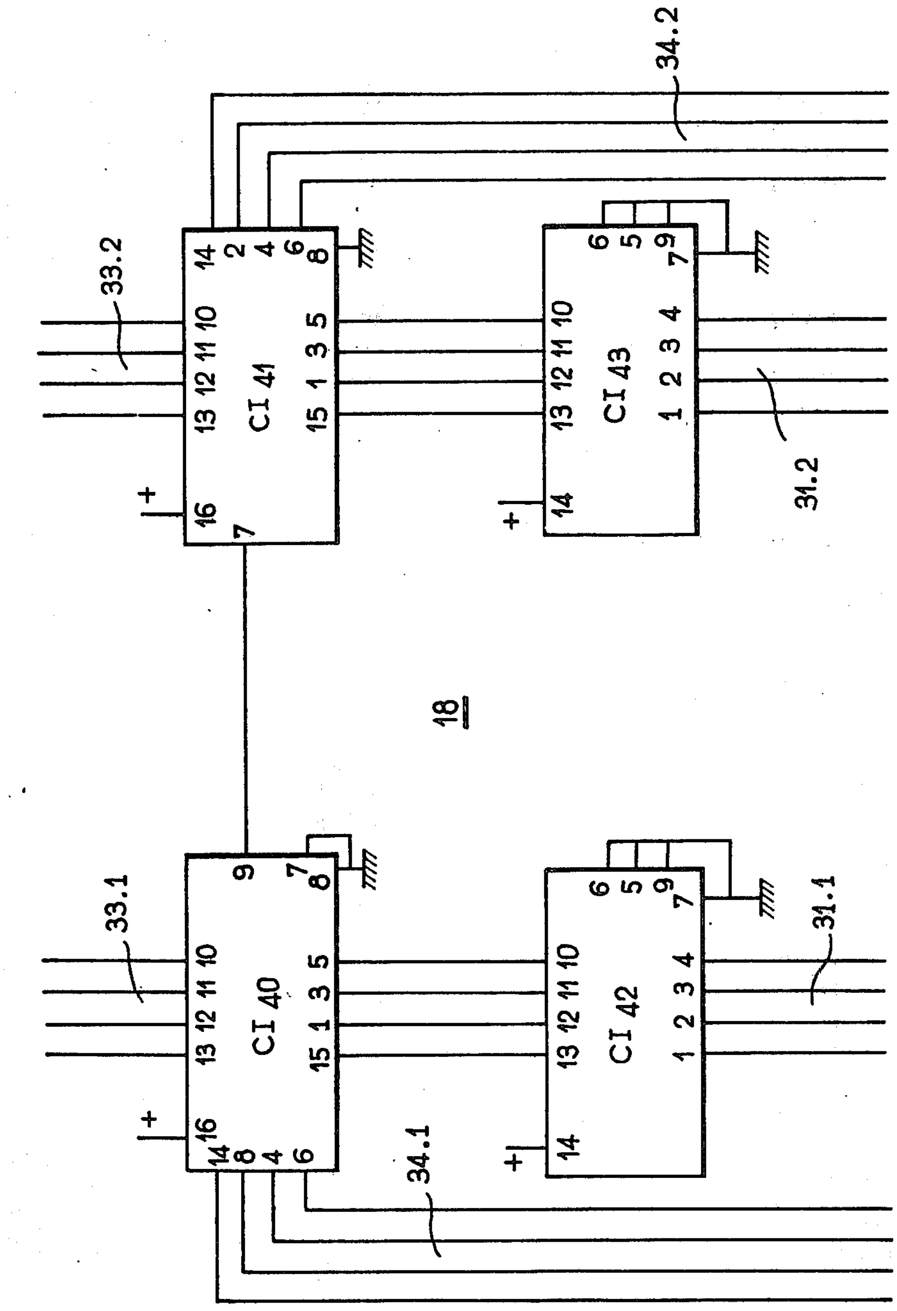
FIG. 4 is the wiring diagram of a more detailed form of embodiment of the adder forming part of the digital computer.

As illustrated in FIG. 4, the injection time computer or adder 18 comprises four integrated circuits CI40 to CI43, wherein circuits CI40 and CI41 are type 14560 circuits and circuits CI42 and CI43 are type 14561 circuits. Thus, for instance, circuit CI42 receives at its inputs "1" to "4" the four binary digits having the heaviest weight from conductors 31.1 constituting one-half of bus line 31 of FIG. 3, and circuit CI43 receives in a similar fashion at its inputs 1 to 4 the four binary digits of lesser weight via conductors 31.2 constituting the other half of bus 31 of FIG. 3. The outputs 10 to 13 of circuit CI42 are connected in parallel to inputs 5, 3, 1 and 15, respectively, of circuit CI40, and the same connections are provided between CI43 and CI41. Moreover, circuit CI40 receives at its inputs 6, 4, 8, 14 the four binary digits of heavier weight via conductors 34.1 constituting one-half of a bus 34 conveying the word B from the up-and-down-counter 17 of FIG. 1 and the adder 18 while circuit CI41 receives in a similar fashion at its inputs 6, 4, 2, 14 the four binary digits of lesser weight via conductors 34.2 constituting the second half of bus 34. The numbers A and B are added to circuit CI40 for the four heavier binary digits and to circuit CI41 for the four lighter binary digits. The result of operation A+B appears in a bus 33 connecting the output of adder 18 to the trigger circuit 19 of FIG. 1, this bus 33 comprising a first portion 33.1 connecting the outputs 10, 11, 12, 13 of circuit CI40 and conveying the four heavier binary digits, and a second portion 33.2 connecting the outputs 10, 11, 12, 13 of CI41 and conveying the four lighter binary digits of the result.

Figure 5:
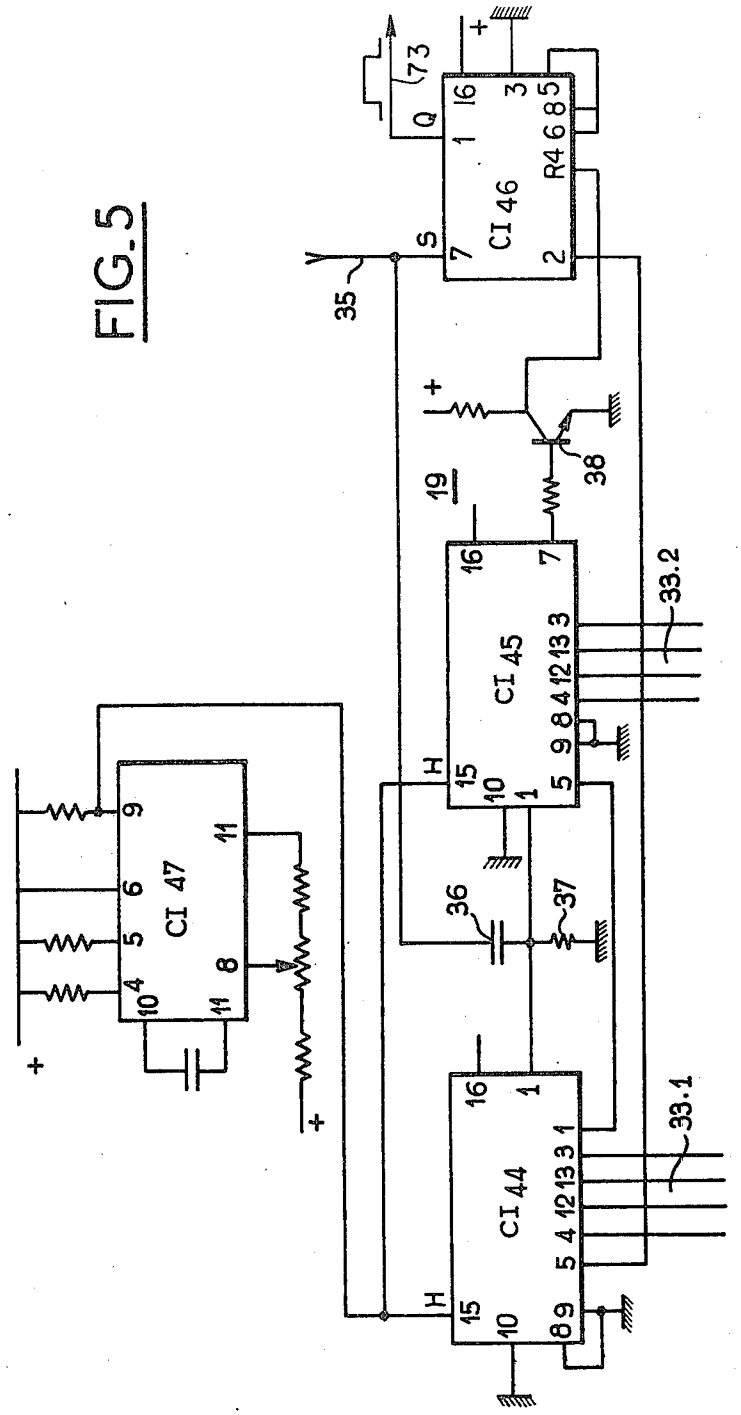
FIG. 5 illustrates a wiring diagram of the bistable trigger flip-flop following the the aforesaid adder.

According to the circuit diagram of FIG. 5, the trigger circuit 19 consists of four integrated circuits CI44 to CI47. The pair of integrated circuits CI44 and CI45 are of type 14510 and operate as down-counting circuits. Integrated circuit CI46 consists of a type 14027 R.S. flip-flop, and integrated circuit CI47 is a type ICL 8038 circuit constituting an internal clock of which the pulses are counted in the negative direction by down-counters CI44 and CI45. Down-counter CI44 has its inputs 3, 13, 12, 4 connected to the first portion 33.1 of bus line 33 interleading from the outputs 10 to 13 of CI40 of FIG. 4, and down-counter CI45 has its inputs 3, 13, 12, 4 connected to the second portion 33.2 of bus 33 leading from the outputs 10 to 13 of circuit CI41 of FIG. 4. A conductor 35 leading from output 10 of the first monostable CI3 (FIG. 2) is directed to the qualification input S of flip-flop CI46 and also to the inputs 1 of down-counters CI44 and CI45 via a capacitor 36 and a grounded resistor 37. This conductor 35 conveys the breaker pulses after they have been shaped and divided by two, as illustrated in FIG. 3, line 3, thus providing one pulse per engine revolution. Each time one of these pulses is delivered to the input S of flip-flop CI46, the output Q thereof is switched to its "upper" state. The same control pulse received from the breaker authorizes the operation of down-counters CI44 and CI45 previously positioned at their inputs 3, 13, 12, 4 by the number delivered by the adder of FIG. 4 via bus line 33. When all the outputs of down-counters CI44 and CI45 are reset, a signal emitted from the output 7 of CI45 is transmitted via a transistor 38 so as to reset the flip-flop RS of integrated circuit CI46 via its input R. Thus, the output Q of this circuit CI46 resumes its lower state. Consequently, the time during which the output Q of integrated circuit CI46 remains in the upper state is a direct function of the down-counting time of down-counters CI44 and CI45. The definition of the down-counting increment is given by the internal clock CI47 having its output 9 connected to the clock inputs 15 of down-counters CI44 and CI45. The frequency of clock CI47 is set by the time constants obtained by means of the capacitors/resistors and potentiometers connected to the various plugs of integrated circuit CI47, a more detailed description of these plugs being unnecessary for those skilled in the art. The width of the pulse transmitted from the output Q of flip-flop CI46 (which is a function of the binary digit A+B calculated by the adder 18) defines the injection time, i.e. the time during which the injection solenoid valve 21 remains open.

Figure 6:
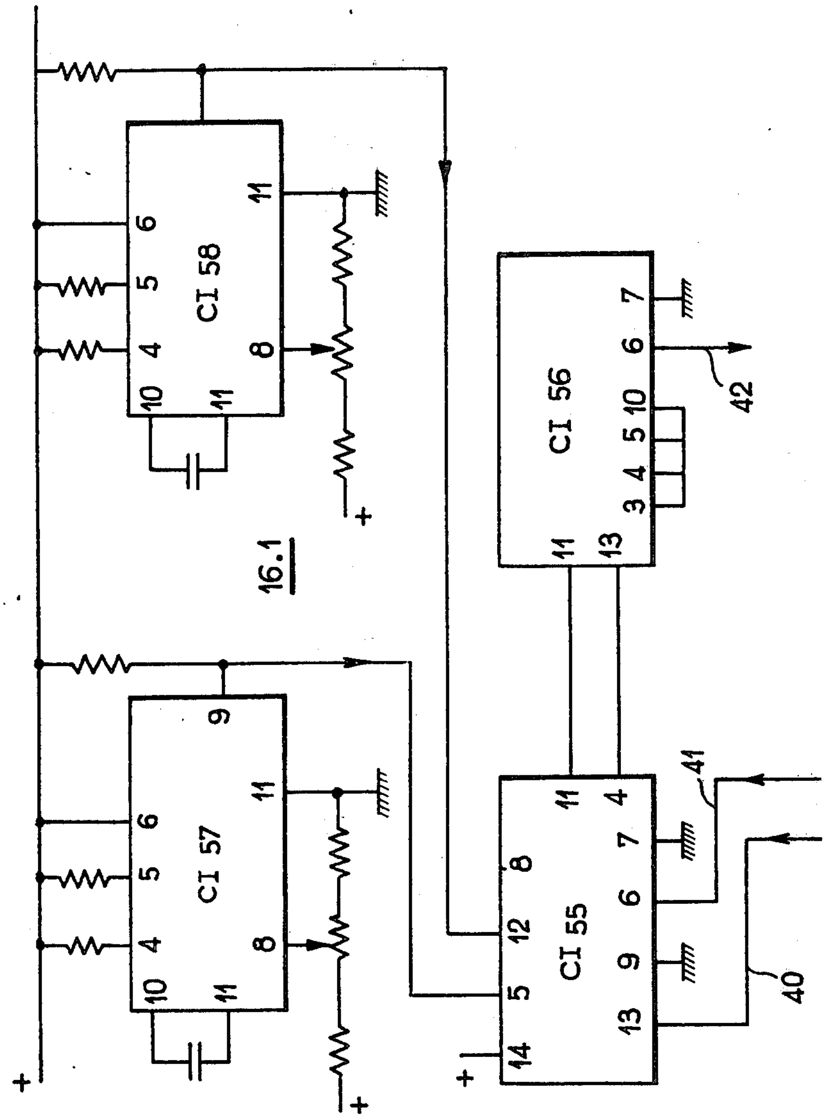
FIG. 6 is a wiring diagram of the oscillator used in conjuntion with the second memory of the circuit according to this invention.

As illustrated in FIG. 6, the oscillator 16 of FIG. 1 comprises two circuits CI57 and CI58, both of the ICL 8038 type like the internal clock CI47 of FIG. 5, which deliver for example an increment frequency for CI57 and a decrement frequency for CI58, these frequencies being transmitted via inputs 5 and 12, respectively, to a type 14081 integrated circuit CI55 consisting of a combination of logic AND gates. The increment and decrement frequencies linked to the subservience and delivered by integrated circuits CI57 and CI58, respectively, are adjusted by means of capacitors, resistors and potentiometers connected to the various plugs of the integrated circuits concerned and which do not require a more detailed description since such adjustments are well known to those conversant with the art. The increment frequency of CI57 (or the decrement frequency of CI58) is selected from the AND function logic gates constituting the integrated circuit CI55 via conductors 40 and 41 designated at the output of probe comparator of FIG. 9, which lead to the corresponding inputs 13 and 6 of the AND gates of circuit CI55. According as one or the other of conductors 40, 41 is concerned, i.e. is in the upper state at the time considered, it is the increment or decrement frequency that is selected. For reasons of combustion, the rate at which the air/fuel mixture is enriched must be higher than the rate at which this mixture becomes leaner; in other words, the decrement must be faster than the increment. The corresponding selection is thus obtained through the probe comparator 13 which, with respect to a predetermined threshold, delivers a "two rich" or "too lean" information concerning the mixture. Therefore, the AND gates of circuit CI55 receives an information via their inputs 13 and 6 as a function of the state of probe comparator 13, this information leading to selecting either the increment frequency of CI57 or the decrement frequency of CI58, which is transmitted via output 4 or output 11 of circuit CI55 for input 13 or input 11 of CI56 which is an integrated circuit corresponding to a type 14000 logic OR function gate and delivers at its output 6 the frequency selected for the ten-stage divider illustrated in FIG. 7 which is applied at the upper left-hand portion via a conductor 42 leading to one input 1 of a type 14024 integrated circuit CI49.

Figure 7:
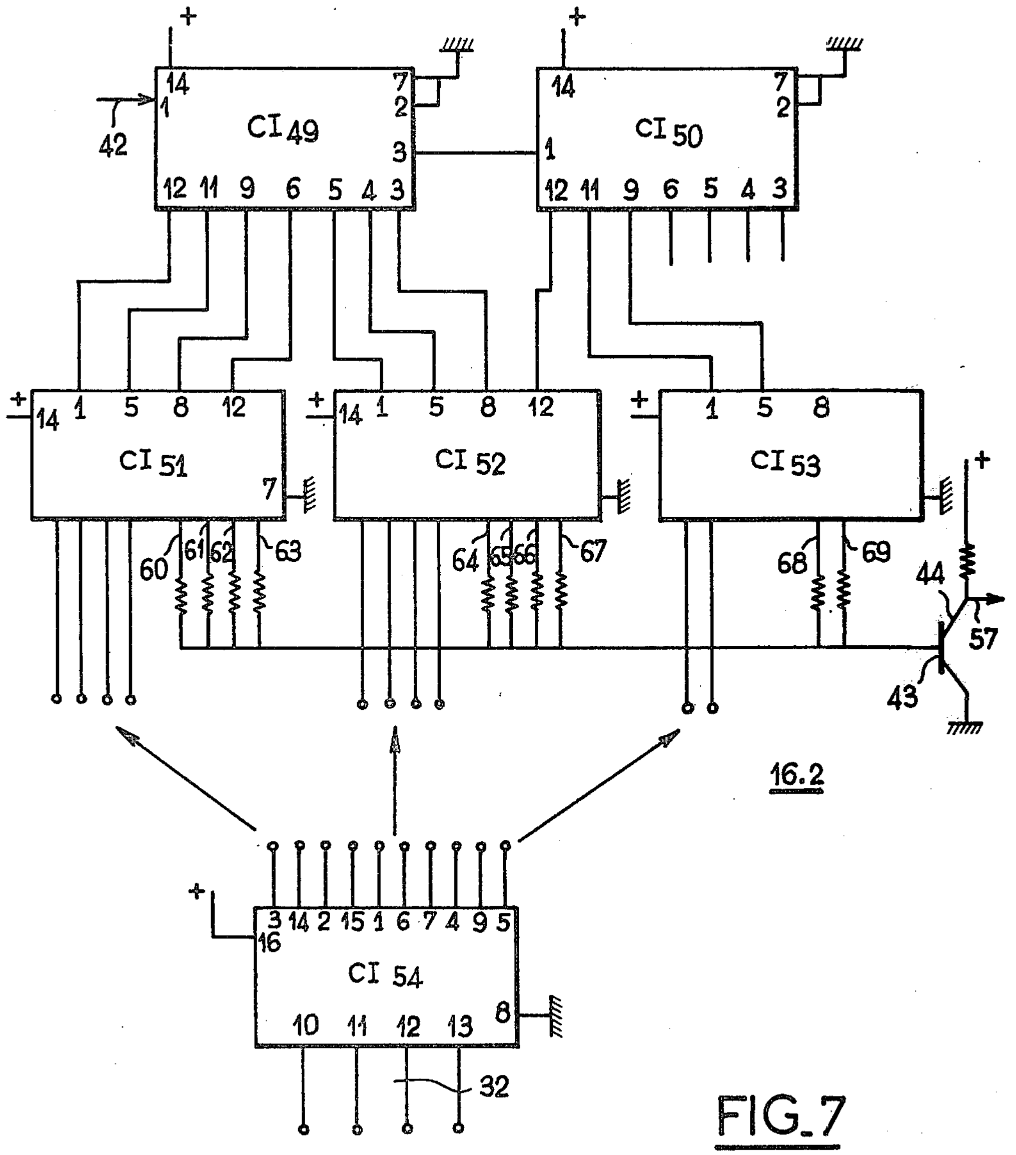
FIG. 7 is the wiring diagram of seven of the stages of the ten-stage divider following the oscillator of FIG. 6 and said second memory.

According to the circuit diagram of FIG. 7, the ten-stage divider comprises from the bottom a type 14028 integrated circuit CI54 having its inputs 10 to 13 connected to the outputs of memory 15 (FIG. 2) via bus line 32 comprising four conductors arranged in parallel. This memory 15 contains the data sorted out according to seven different speed levels, and these data are returned as a function of the memory addressing. It is thus to be seen that in the present example, only seven of the ten available stages of the ten-stage driver 16.2 are utilized. Circuit CI54 will thus receive words consisting of four binary digits in the binary coded decimal form which it decodes into decimal form. The ten outputs of decoder CI54 are connected to an equal number of inputs of logical AND function gates distributed among these type 14081 integrated circuits CI51, CI52 and CI53. Besides, the information transmitted via conductor 42 on the upper, left-hand portion of the diagram of FIG. 7 is fed to the integrated circuits CI49 and CI50, both of the 14024 type, and affects the outputs thereof which are connected in parallel to an equal number of inputs of the integrated circuits CI51, CI52, CI53 comprised of a set of logic AND gates. As a function of the validation of outputs 60 to 69 of the logic AND gates grouped in the aforesaid integrated circuits CI51, CI52 and CI53, i.e. according as an increment or decrement frequency is delivered to input conductor 42, and according to the nature of the data received by the input bus 32 from memory 15, a servo frequency is fed to the collector 44 of a transistor 43 having its base connected to all the outputs 60 to 69 of the logic AND gates, this servo frequency being subordinate to the engine speed since the outputs are validated by memory 15.

Figure 10:
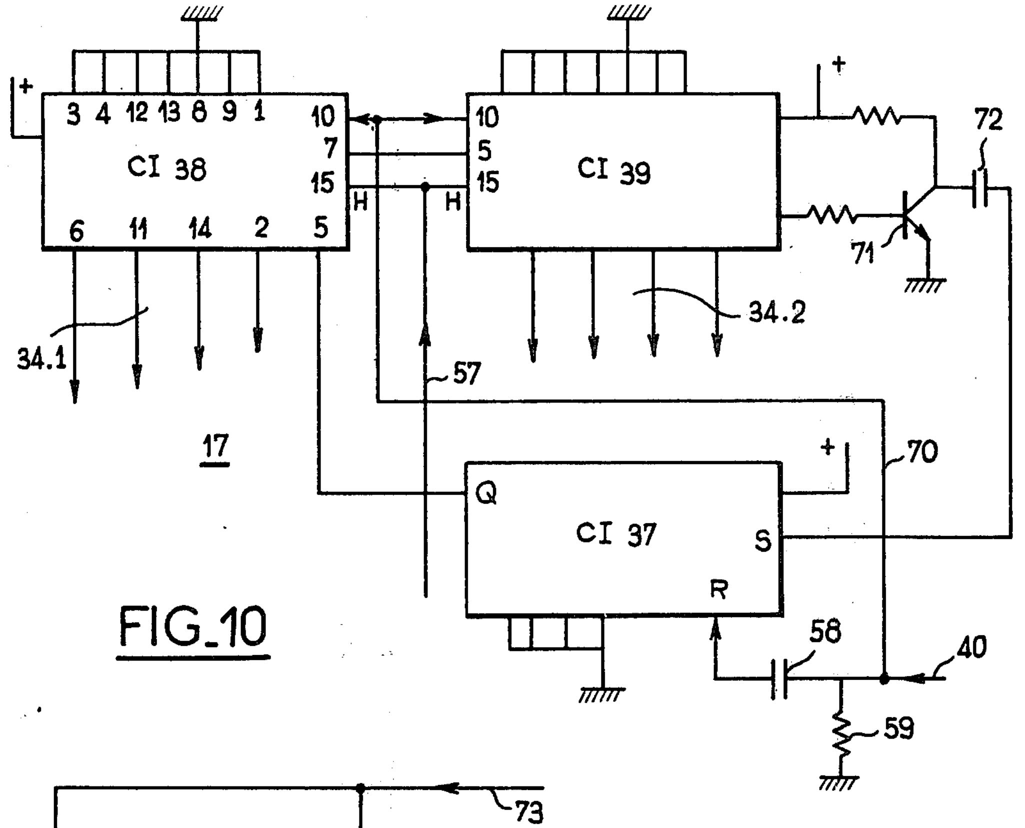
FIG. 10 is a wiring diagram of the up-and-down counter according to this invention, disposed between the probe signal comparator, the ten-stage divider and the second input of the adder of FIG. 4.

The oscillator-divider 16 of FIGS. 6 and 7 will thus generate a clock frequency which is the loop time subservience frequency controlling the second-order correction of the up-and-down-counter of FIG. 10 responsive in turn to the probe comparator 13.

Now reverting to the second main input of the digital computer according to this invention, which corresponds to probe λ denoted by the reference numeral 11, as shown in FIG. 8 the probe amplifier 13 comprises a pair of operational amplifiers CI32 and CI33 equipped with a set of resistors and capacitors. The input circuit CI32 has a very large input impedance, i.e. more than 10 megohms, with respect to the probe, and also a very high common-mode rejection ratio. Resistors 46 and 47 are selected with a view to provide a gain of "one" at the stage; these resistors are 1-percent ones for by fixing the amplifier gain they assist directly in causing the probe voltage to vary at the output of amplifier CI32 which is a circuit having a very high stability. Both amplifiers CI32 and CI33 are mounted as inverters and the output of CI32 is connected to the reversing input of CI33 via a resistor 48. Another resistor 49 is provided for setting the gain of amplifier CI33 and the signal obtaining at its output 50 is the direct image of the probe voltage with a gain of ten, so that it is possible to operate within a voltage range that can be exploited with greater facility without interfering with the probe operation.

FIG. 9 illustrates a typical form of embodiment of a probe signal comparator comprising the conductor 50 from the probe amplifier of FIG. 8. This probe signal comparator comprises three operational amplifiers CI34, CI35 and CI36 equipped with various passive elements. A resistor 51 and a Zener diode 52 set the 12-Volt stabilized voltage which can be adjusted by means of a potentiometer 53 for obtaining a ten-Volt voltage setting the upper threshold or limit to the voltage of a potentiometer 54 provided for adjusting the regulation voltage which, through the medium of the operational amplifier CI34, is fed to the reversing input of the third operational amplifier CI36 having its non-reversing input connected to the output of the second operational amplifier CI35 of which one input is connected to conductor 50 conveying the probe voltage. Both amplifiers CI34 and CI35 are mounted as impedance adapters in order to preserve these last constants on the two inputs of operational amplifier CI36 acting as a comparator stage. The output of operational amplifier CI36 controls a pair of transistors 55 and 56, and the signals necessary for controlling the increment frequency and the decrement frequency are taken from the collectors of said last-mentioned transistors via conductors 40 and 41, respectively, which are found in FIG. 6, as inputs for oscillator 16.

In the form of embodiment illustrated in FIG. 10, the up-and-down-counter 17 of FIG. 1 comprises three integrated circuits CI37, CI38 and CI39, and various passive elements associated therewith. CI37 constitutes a type RS flip-flop between its terminals 4 and 7 of type 14027 already mentioned with reference to FIG. 5, for example; CI38 and CI39 constitute a pair of up-and-down-counters of type 14510 already disclosed with reference to FIG. 5. The purpose of this stage is to create the number B of eight binary digits that are added algebrically to the number A of eight binary digits received from memory 14 and already mentioned in the foregoing. Circuit CI37, which is a type RS flip-flop, enables the up-or-down-counting in the up-and-down-counters CI38 and CI39 of pulses emitted from the output 57 of the divider of FIG. 7. In this FIG. 7, conductor 57 is connected to the collector 44 of transistor 43 and in FIG. 10 this conductor 57 leads to the clock inputs 15 of up-and-down-counters CI38 and CI39. The output 40 taken from the collector of transistor 56 disposed at the output of the probe comparator stage of FIG. 9 is connected in FIG. 10 to the reset input 4 of flip-flop CI37 via a shift network comprising a series-connected capacitor 58 in series and a shunted resistor 59. When the output 40 of the probe comparator of FIG. 9 is in its upper state corresponding to a too rich mixture, the shift network 58–59 emits a pulse for the reset input R of flip-flop CI37, thus causing its output Q to switch to its low state to permit the operation of up-and-down-counters CI38 and CI39. In fact, these last-mentioned counters are in a counting condition since the up-and-down control gate 10 of CI38 and CI39 is energized via a conductor 70 connected in parallel to the input R of flip-flop CI37. The counting proceeds as long as the state of the output 40 of probe comparator remains unchanged, i.e. in the higher state or position. When it switches to the lower state or position corresponding to a too lean mixture, the assembly CI38, CI39 begins to count down, and so forth. Conductors 34.1 connected to outputs 6, 11, 14, 2 of CI38 transmit for example the four binary digits of the heavier weight of number B for the adder CI40 of FIG. 4, and conductors 34.2 connected to outputs 6, 11, 14, 2 of CI39 transmit for instance the four binary digits of lighter weight of number B for adder CI41 of FIG. 4.

The down counting by the up/down counter 17 must be discontinued when all the outputs 6, 11, 14 and 2 of which are switched to their lower 0 state corresponding to the lesser value of word B. Therefore, the switching of all outputs 6, 11, 14, 2 to the lower state is detected and a pulse is delivered via a transistor 71 and a capacitor 72 to the S gate of RS flip-flop CI37, so that Q is switched to "one" and the down counting is discontinued. Therefore, any down counting is positively prevented since a state of impossibility is attained. It is necessary to wait until a pulse of adequate direction be fed again to input R of flip-flop RS CI37 before operation can be resumed in the up counting direction.

Figure 11:
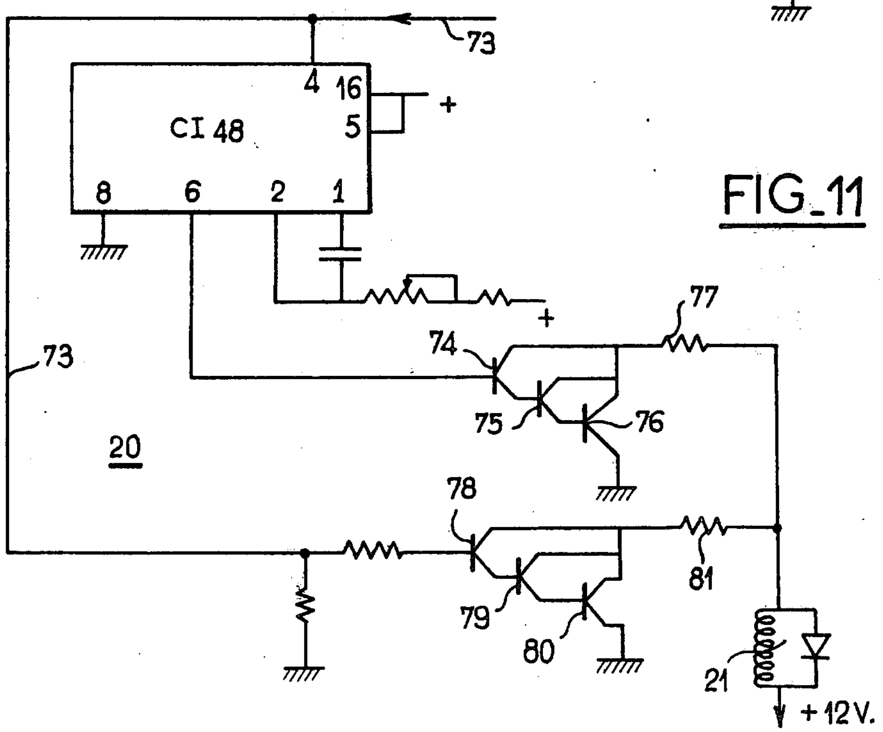
FIG. 11 illustrates a wiring diagram of the amplifier stage controlling the air-injection valve.

According to the form of embodiment shown in FIG. 11, illustrating the circuit or wiring diagram of the power amplifier controlling the injector 20 of FIG. 1, the latter comprises firstly a monostable multivibrator CI48 of type 14528 like the one already mentioned with reference to the speed detector of FIG. 2. This monostable multivibrator CI48 has its input 4 connected in via a conductor 73 leading from the output Q of flip-flop RS CI46 shown in FIG. 5 and conveying a pulse of a width proportional to the time period during which the injector must remain open. The power amplifier proper, shown in FIG. 11 is characterized in that it comprises a two-state control incorporating two circuits disposed in parallel.

A first circuit conveying the injector solenoid pull current (of which the holding time is controlled by the calibration of the monostable multivibrator CI48) is connected to the output 6 of this multivibrator and comprises transistors 74, 75, 76 so connected as to provide a Darlington power stage, and a resistor 77 for fixing the current in the injector.

A second circuit constituting an extension of conductor 73 from the RS flip-flop CI46 of FIG. 5 and conveying the holding current of the injector solenoid coil during the opening time demanded by the trigger circuit of said FIG. 5, minus the pull time of monostable univibrator CI48, comprises transistors 78, 79, 80 forming together a Darlington power stage and a resistor 81 for calibrating the holding current in the injector of which the solenoid coil 21 and a diode 82 connected in parallel thereto are shown in the bottom right-hand corner of FIG. 11.

Although a specific form of embodiment of this invention has been described hereinabove and illustrated in the accompanying drawings, it will readily occur to those skilled in the art that various modifications and changes may be brought thereto without departing from the scope of the invention as set forth in the appended claims.

What is claimed as new is:

1. An air-fuel mixture electronic control system for use with an internal combustion engine, and adapted for control of the opening time of a solenoid operated air injection valve (21) in the mixture induction system of the engine, said control system comprising pulse generating means (10) responsive to the engine rotational velocity and a voltage generating probe (11) responsive to the chemical composition of the exhaust gases of the engine for detecting either a rich or lean state of the air-fuel mixture, wherein there is provided an address computer (12) having an input responsive to said pulse generating means pulses and for producing addresses which are a function of said pulses representative of the engine rotational velocity, a first memory (14) containing correction data related to the stoichiometric conditions of combustion of the mixture as a function of the engine rotational velocity, said first memory having its selection inputs connected to the outputs of said address computer (12), a second memory (15) having its selection inputs connected to the outputs of said address computer (12) and containing stored numerical data dependent upon the engine rotational velocity, said second memory having its outputs connected to regulation means cooperating with said probe (11) and said regulation means comprising an oscillator (16.1), a programmable divider (16.2) having its clock input connected to said oscillator (16.1) and its programmable inputs connected to the outputs of said second memory (15), and an up-down counter (17) having its clock input connected to the output of said programmable divider (16.2), and its up-counting and down-counting input responsive to the rich state and the lean state of the air-fuel mixture as detected from the probe (14) through a voltage comparator (13.2), and a digital adder (18) having its inputs connected to the outputs of said up/-down counter (17) to sum up the data issued from said first memory and from said up-down counter, respectively, as first-order and second-order correction data, and a periodically operated trigger circuit (19) for triggering said solenoid operated air injection valve (21), said trigger-circuit (19) being connected and responsive to the outputs of said digital adder (18) to determine the opening time of said solenoid operated air injection valve.

2. An air-fuel mixture electronic control system for internal combustion engine according to claim 1, wherein said oscillator (16.1) includes means responsive to the output voltage of said comparator (13.2) to generate two different clock frequencies depending on the detected rich or lean states of the air-fuel mixture for causing a higher rate of regulation when the mixture is enriched then when it is rendered leaner.

3. An air-fuel mixture electronic control system for internal combustion engine, according to claim 1, wherein said trigger-circuit (19) comprises an up-down counter (CI44, CI45) having presetting inputs which are connected to the outputs of said digital adder (18), a count-down enabling input which is connected to said pulse generating means (10, CI3), and a down-counting input connected to clock means (CI47), a flip-flop (CI46) having an input connected and responsive to said pulse generating means and a corresponding output controlling the opening of said solenoid operated air injection valve (21) to open it when activated, and its other input connected to a circuit responsive to the occurrance of a down-counting to zero of said up/down counter (CI44, CI45) to reset the flip-flop (CI46) and thus deactivate said output controlling the opening of the solenoid operated air injection valve.

4. An air-fuel mixture electronic control system according to claim 3, comprising a monostable multivibrator (CI48) having its control input connected to said flip-flop output controlling the opening of the solenoid operated air injection valve, said monostable multivibrator (CI48) having a corresponding output connected by an amplifier (74–76) to the solenoid operated valve (21) to convey the energizing current thereof, and comprising in parallel connection with said monostable multivibrator (CI48) another amplifier (78–80) connected to said solenoid operated air injection valve (21) for conveying the holding current of said solenoid operated air injection valve during the activation time of said flip-flop output (CI46).

5. An air-fuel mixture electronic control system according to claim 1, wherein said address computer (12) comprises an internal clock (CI8-CI6), a second up-down counter (CI9-CI10) having a presetting inputs to be set to a maximal address value by a pulse generator (CI15-second half), said second up/down counter (CI9-CI10) having a down-counting input connected to the output of said internal clock (CI8-CI6), and a down-counting enabling input connected to the output of a second pulse generator (CI4) emitting a periodical signal succeeding to the presetting signals emitted by said first-mentioned pulse generator (CI5-second half), and a plurality of flip-flops (CI11 to CI14) for storing the address resulting from the aforesaid down-counting, said plurality of flip-flops having their inputs connected to the outputs of said second up/down counter (CI9-CI10) and their outputs connected to said first (14) and second (15) memory, and a third pulse generator (Ci5-first half) responsive to said pulse generating means (10-CI3) depending on the engine rotational velocity for causing the aforesaid address storing operation, whereby said first mentioned pulse generator (CI5-second half) is activated by said third pulse generator (CI5-first half) to load the presetting inputs of said second up/down counter (CI9-CI10) after each address storing operation.

* * * * *